United States Patent [19]

Shellhause

[11] 4,387,932

[45] Jun. 14, 1983

[54] PRESSURE PROPORTIONER

[75] Inventor: Ronald L. Shellhause, Vandalia, Ohio

[73] Assignee: General Motors Corporation, Detroit, Mich.

[21] Appl. No.: 255,100

[22] Filed: Apr. 17, 1981

[51] Int. Cl.³ .............................................. B60T 8/26
[52] U.S. Cl. .................................. 303/24 F; 303/6 C
[58] Field of Search ............ 188/349; 303/6 C, 22 R, 303/24 A, 24 C, 24 F

[56] References Cited

U.S. PATENT DOCUMENTS 3,727,987  4/1973  Shellhause .................... 303/6 C
3,795,424  3/1974  Lewis ........................... 303/24 F Primary Examiner—Duane A. Reger
Attorney, Agent, or Firm—D. D. McGraw

[57] ABSTRACT

A two stage brake pressure proportioner using brake fluid flow energy to accelerate actuating movement of a control valve once inertia has begun to move the control valve, achieving a precise deceleration trip point under all braking conditions. The proportioning pistons are preset for proportioning operation during the initial phase of brake actuation before inertial actuation.

9 Claims, 4 Drawing Figures

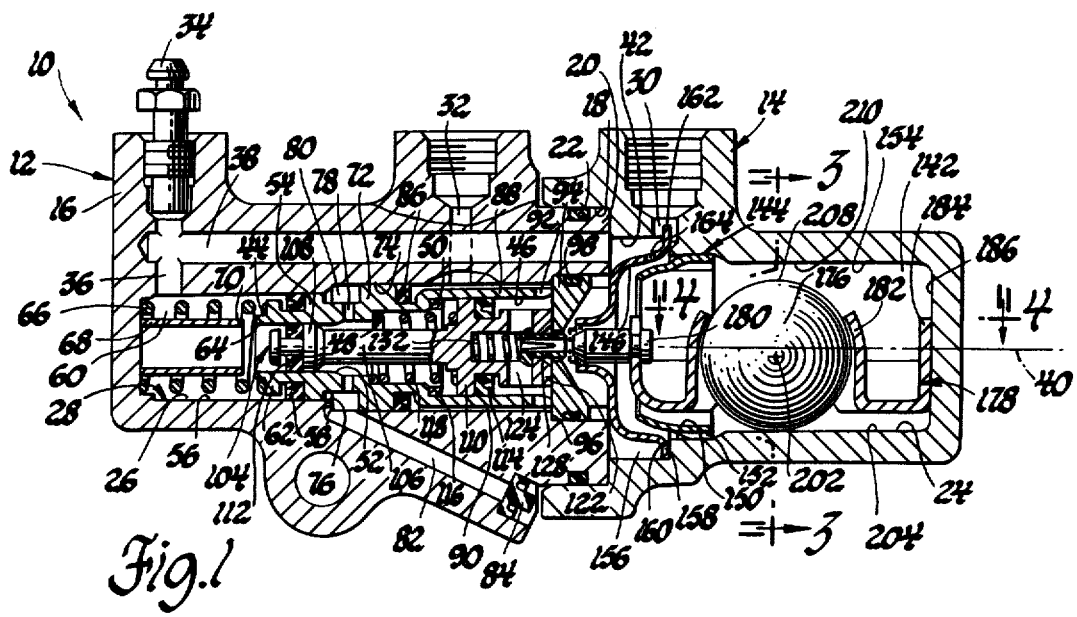

PRESSURE PROPORTIONER

The invention relates to a brake pressure proportioner and more particularly to one which is inertia actuated and which is flow energy responsive. The proportioner embodying the invention uses an inertia responsive ball having a saddle frame positioned on the ball and a control valve supported by the saddle frame. The control valve cooperates with a control orifice through which flow energy is directed to assist in moving the valve into the actuated position once that movement is started by inertia. The valve functions in a preset mode at the on-set of brake actuating pressure generation before inertia actuation occurs. It operates in a proportioning mode after inertia actuation occurs.

The proportioner uses a flow divider and a flow deflector arrangement with an accelerating orifice through which part of the flow of brake fluid is directed as the brake system in which the proportioner is contained is being actuated. The baffle or flow divider directs most of the fluid flow passing through the accelerating orifice along the interior of the flow divider, about the control valve and through the control orifice. The flow divider diverts a major part of the flow around the exterior surface of the flow divider so as to prevent side thrust on the inertia responsive valve mechanism.

When the control valve has been actuated by closing the control orifice, it closes a fluid path around the proportioning mechanism and requires the outlet fluid pressure from the proportioner to be proportioned relative to the inlet fluid pressure under control of the proportioning section. The proportioning section has first and second stage proportioning pistons so that the proportioning action, once initiated, takes place in two stages as the inlet pressure is increased.

The proportioner also has an arrangement which prevents proportioning action during reverse acceleration. A hold-off sleeve-like pin extending into the control orifice controlled by the control valve prevents the control valve from closing that orifice when the vehicle in which the proportioner is installed accelerates in reverse. This permits full braking pressure to be available when the brakes are applied to stop reverse vehicle movement. The hold-off pin also prevents the closure of the control orifice by the control valve if the vehicle is traveling forwardly down a sufficiently steep incline to permit the inertia ball to move in the actuating direction under gravitational influence before brake pressure is delivered to the proportioner.

By using flow energy of the brake fluid to accelerate the control valve, the time required for the valve to move sufficiently to operate is so controlled that the control orifice will be closed at substantially the same deceleration under different deceleration conditions. Such conditions include changes in brake apply rates from a slow rate through a panic apply rate. The use of the flow energy to accelerate the control valve also minimizes changes in proportioner actuation points caused by changes of viscosity of the brake fluid as ambient operating temperatures change.

IN THE DRAWINGS

FIG. 1 is a cross section view with parts broken away of a proportioner embodying the invention.

FIG. 2 is a fragmentary enlarged portion of the control valve area of the proportioner of FIG. 1.

FIG. 3 is a cross section view taken in the direction of arrows 3—3 of FIG. 1 and particularly illustrating the inertia ball, the saddle frame and the control valve as contained in the inertia chamber of the proportioner.

FIG. 4 is a plan view taken in the direction of arrows 4—4 of FIG. 1 showing the inertia ball, the saddle frame, and the control valve of the proportioner of FIG. 1.

The proportioner 10 includes a housing 12 defined by an inertia housing section 14 and a proportioning housing section 16. The housing sections are suitably joined together by fastening means not shown and a pilot fit provided by a shouldered recess 18 at the open end of housing section 14. A complementary end 20 of housing section 16 fits within recess 18 and abuts the shoulder of that recess. A suitable seal 22 is provided to prevent fluid leakage past the joint.

Housing section 14 has a bore section 24 opening through the shouldered recess 18 and axially aligned with a bore section 26 of housing section 16. Bore sections 24 and 26 combine to define a bore 28. The brake fluid pressure inlet 30 is provided in a part of housing section 14 and opens transversely into a portion of bore section 24. The inlet is arranged to be suitably connected to a brake actuating pressure generating device such as a master cylinder. A brake pressure outlet 32 is provided in housing section 16 and opens transversely into a portion of bore section 26. Outlet 32 is arranged to be connected in a brake circuit leading to one or more vehicle brakes to be actuated under control of the proportioner. Housing section 16 also has a bleeder valve 34 connecting with a passage 36 which in turn communicates with a portion of bore section 26. When the proportioner 10 is suitable installed in a vehicle, bleeder valve 34 and the passages and chambers of the proportioner are so positioned that air contained in the proportioner may be bled out through the bleeder valve. A passage 38 is formed in housing section 16 substantially parallel to the axis 40 of bore 28. One end of passage 38 intersects bleeder passage 36 and the other end opens into an enlarged portion 42 of bore section 24 adjacent the shouldered recess 18. Inlet 30 also opens into the enlarged bore portion 42.

The proportioning section of proportioner 10 is contained within housing section 16 and includes a second stage proportioning piston 44 reciprocably received in bore section 26. Piston 44 has a stepped bore 46 extending therethrough. Bore 46 includes steps or shoulders 48 and 50. It also includes a chamfered shoulder 52. The outer surface of the second stage proportioning piston 44 has a flange 54 formed thereon which is reciprocably received in the portion 56 of bore section 26 axially remote from bore section 24. A V-block seal 58 is supported by flange 54 and cooperates with the bore portion 56 to define therewith a chamber 60. The proportioning piston 44 has a smaller diameter flange 62 positioned intermediate seal 58 and the piston end 64. Flange 62 provides a seat for one end of the second stage proportioning spring 66, which is a coil spring received in chamber 60. The other spring end acts on the closed end of bore section 26. A spacer 68 is positioned in chamber 60 so that the spacer end 70 is engageable with the piston end 64 to limit piston movement in the leftward direction as seen in FIG. 1.

The second stage proportioning piston 44 has another flange 72 somewhat larger in diameter than flange 54 and reciprocably received in the portion 74 of bore section 26 which is separated from the portion 56 by a chamfered bore shoulder 76. A cross passage 78 extends through piston 44 axially intermediate flanges 54 and 72 and connects a part of stepped bore 46 with a vent chamber 80 defined by the part of bore section 26 adjacent shoulder 76 and the bore portion 74. A vent passage 82 is formed in housing section 16 and communicates vent chamber 80 with atmosphere under control of the vent valve 84.

A V-block seal 86 is supported by the flange 72 on the opposite side thereof from vent chamber 80 and reciprocably seals against the wall of bore portion 74. The rightward extension 88 of piston 44, as seen in FIG. 1, contains shoulder 50 and is radially spaced inwardly from the wall of bore portion 74 so that an annular outlet chamber 90 is provided between the wall of bore portion 74 and the outer surface of piston extension 88. Outlet 32 is connected to the chamber 90. The rightward end 92 of extension 88 is castellated or otherwise suitably provided with openings positioned to permit fluid flow from the rightward end of stepped bore 46 to outlet chamber 90 and outlet 32.

An annular retainer 94 is contained in the right end of bore section 26 and abuts a bore shoulder 96, which accurately locates the retainer in the bore. The second stage proportioning spring 66 continually urges the rightward end 92 of piston 44 toward engagement with retainer 94. A seal 98 in the outer periphery of retainer 94 seals against the wall of bore section 26. The opening 100 in retainer 94 is in axial alignment with bore 28 along axis 40. Retainer 94 has castellations 102 extending rightwardly so that they are located substantially at the right end of bore section 26 when retainer 94 engages shoulder 96. Castellations 102 provide flow openings as will be further described.

A first stage proportioning piston 104 is reciprocably received in the stepped bore 46 of the second stage proportioning piston 44. Piston 104 has a stem 106 on which flanges 108 and 110 are formed. Flange 108 is smaller in diameter than flange 110 and is reciprocably received in the smaller leftward portion of stepped bore 46. A V-block seal 112 is supported on flange 108 and seals the bore 46 against fluid leakage from chamber 60 past flange 108. Flange 110 is reciprocably received in the enlarged portion of stepped bore 46 contained within the piston extension 88. A V-block seal 114 is supported by flange 110 and is arranged to prevent fluid leakage from the right end of stepped bore 46 past flange 110. An annular spacer 116 is contained in stepped bore 46 and abuts shoulder 50. Spacer 116 is so sized in axial length and positioned as to limit the leftward movement of flange 110, and therefore of first stage proportioning piston 104, relative to the second stage proportioning piston 44. A first stage proportioning spring 118 is received in stepped bore 46 so that one spring end acts against shoulder 48 and the other spring end acts against flange 110 to continually urge the piston 104 rightwardly toward retainer 94.

The rightward extension 120 of the first stage proportioning piston 104 is radially smaller in diameter than the portion of bore 46 formed within extension 88 of piston 44. Extension end 122 may abut retainer 94. A cross passage 124 in extension 120 intersects an axial recess 126 formed in extension 120 and opening through end 122. A hold-off pin or sleeve 128 is movably fitted in recess 126 and has a flange 130 received in cross passage 124 so as to limit rightward movement of the pin or sleeve while permitting leftward movement. A spring 132 in recess 126 abuts the left end of the recess and the left end of pin 128 so as to continually urge the pin into flanged engagement with the wall of cross passage 24 as seen in FIGS. 1 and 2.

Hold-off pin 128 has a bore 134 extending axially therethrough and is provided with slots 136 extending radially through the pin body so that the portion of the pin including flange 130 has a fingerlike construction. This permits insertion of the pin through end 122 for assembly purposes. The end 138 of pin 128 opposite flange 130 extends through opening 100 to define an annular orifice 140 so long as pin 128 remains within opening 100.

The housing section 14 contains the inertia sensing mechanism, the flow directing structure for use of flow energy, and the control valve. An inertia chamber 142 is provided by the right end of bore 28 as seen in FIG. 1. The flow directing mechanism 144 is contained in the leftward portion of inertia chamber 142 and includes a flow divider or baffle 146 and a flow deflector 148. The divider and the deflector are generally annular in construction. The deflector has a generally toroidal segment surface with the right end having a larger diameter than the left end, as seen in FIG. 1, the right end being tightly fitted into the bore portion 150. The right end of the deflector is provided with suitable openings 152 which extend axially and provide for fluid flow between the bore portion 150 and the body of the deflector 148 and substantially along the cylindrical bore wall 154 which defines chamber 142. Openings 152 may be formed by indenting the deflector 148 at various circumferential locations.

The flow divider or baffle 146 is received within the leftward end 156 of chamber 142. The divider body has a flange 158 formed on its larger diameter end. The flange abuts a shoulder 160 which divides the chamber end 156 from the remainder of chamber 142. In the particular construction illustrated, a tang 162 extends radially outwardly from flange 158 so that it is received within the inlet 30 to provide positive rotational positioning of the divider. The accelerating orifice 164 formed in the body of divider 146 is therefore located substantially in alignment with the inlet 30 so that some of the fluid flowing into the proportioner 10 through inlet 30 is directed generally radially inward through orifice 164 to the annular space 166 formed by the divider 146 and the deflector 148. The left end 168 of the deflector 148 is positioned radially inward of orifice 164 so that fluid flow through the orifice is deflected to follow the desired paths. Some of the fluid flow will move through openings 152 toward the right end of the inertia chamber 142. Most of the fluid flowing through orifice 164 will move inwardly along the inner surface of the flow divider 146. An intermediate part of the flow divider engages retainer ends 102 to assist in holding the retainer in position against shoulder 96. The flow divider has an axially extending opening 170 which is positioned coaxially with axis 40 and formed by a nozzle 172. The nozzle extends axially toward retainer 94 but is spaced therefrom. Some of the flow entering inlet 30 will pass through the outer part of chamber end 156 along the outside of divider 146, through the flow openings 102 of retainer 94 and between the outer part of nozzle 172 and the surface 174 of retainer 94 so as to pass through the opening 100 in the retainer. The portion of the fluid flow passing along the interior of divider 146 and through orifice 170 is also so directed toward opening 100. The flow divider and baffle prevent fluid impingement side thrust on the control valve and the inertia ball described below.

The inertia mechanism contained in chamber 142 includes an inertia ball 176 supporting a saddle frame 178 and the control valve 180. The saddle frame 178 is illustrated as being formed of sheet metal to provide a socket 182 fitting over the ball, a frame end 184 extending rightwardly from the socket 182 and engageable with the end wall 186 of chamber 142, and another frame end 188 extending leftwardly toward retainer 94. The control valve 180 is secured to the frame end 188 so that it is normally located coaxially along the bore axis 40 and therefore is in substantial axial alignment with flow divider opening 170, retainer opening 100, and hold-off pin 128. Valve 180 has a valve head 190 which is illustrated as being frusto-conical so as to be able to close opening 100 when the valve head extends into that opening under certain conditions of operation. The body of valve 180 is spaced radially inward from nozzle 172 and extends through opening 170 so as to define therewith an annular orifice 192. In the inactive position shown in the drawing, the valve head 190 is axially spaced from the end 138 of pin 128 as well as being axially spaced from opening 100 of retainer 94.

The portion of the saddle frame 178 defining socket 182 includes side pivot supports 194 and 196 which respectively contact ball 176 at lateral pivot points 198 and 200. Thus the socket 182 is slightly eliptical rather than circular, as can be seen in FIG. 4. Pivot points 198 and 200 are positioned slightly above the center 202 of the ball 176, as well as above the axis 40. Ball 176 is in rolling engagement with the lower wall surface 204 of the chamber wall 154 so that it rolls along a line 206 parallel to and positioned under axis 40. It tends to stay in spaced relation to other parts of chamber 154 because of the trough effect of the larger diameter chamber wall. The saddle frame 178 is pivotally supported on the ball at pivot points 198 and 200 so as to minimize any friction loss as the ball rolls relative to the saddle frame. The saddle frame 178 is provided with sufficient metal in its lower parts below the center 202 of the ball 176 to counterweight balance the saddle frame on the ball. It is preferred that the metal below the ball center is at least two times that of the metal above the ball center. The lower parts of saddle frame ends 184 and 188 provide most of the metal weight for this purpose. Since valve 180 is secured to the forward end 188 of the saddle frame, there is more metal by weight in the rear end 184 than in the front end 188, effectively balancing the assembled saddle frame and valve on the ball about the pivot points 198 and 200. The saddle frame is then not required to engage the inertia chamber wall 154 during ball movements, keeping drag to a minimum.

The upper surface 208 of the ball is positioned well below the upper wall surface 210 of chamber wall 154 so that fluid flowing through openings 152 can readily pass over the ball and into the right end of chamber 142, as seen in FIG. 1, when the ball 176 moves leftwardly as the proportioner is in the process of being actuated. Thus the flow through openings 152 does not impinge on the ball so as to hinder its actuating movement and the ball does not tend to be held in the rightward portion of chamber 142 because fluid is not readily moved into the portion of the chamber from which the ball is being displaced. Since the openings 152 may be spaced circumferentially at various points around deflector 148, the flow tends to flow around the outer portion of the ball, further contributing to ease of ball movement.

The proportioner 10 is normally installed in a vehicle so that the axis 40 is at a slight angle to the horizontal, with the inertia section containing ball 176 being at the lower side. This angle is predetermined in order to obtain the desired functioning, and is usually on the order of 4° to 10°. The axis 40 is aligned in a fore and aft direction with the ball 176 being at the rearward end. Thus, as seen in FIG. 1, the normal forward direction of vehicle travel would be leftward. In the typical brake system, a master cylinder is provided to generate brake actuating pressure. This pressure is delivered to one or more wheel brakes. It is common to have a plurality of such braking circuits operated by a plurality of pistons in the master cylinder assembly. In one example, a brake circuit is provided for a set of rear wheel brakes and another brake circuit is provided for a set of front wheel brakes. The proportioner 10 may be utilized in the circuit for the rear wheel brakes. In brake circuits which are diagonally split, the two rear wheel brakes are in separate circuits. Therefore a proportioner 10 would be required in the portion of each circuit leading to the rear wheel brake of that circuit or a master-slave proportioning arrangement using one proportioner 10 as the master could be used. In any of these arrangements, it is known to be desirable to proportion the pressure actuating the rear wheel brake or brakes relative to the pressure actuating the front wheel brake or brakes, particularly when disc brakes are used on the front wheels and drum brakes are used on the rear wheels. Such proportioning preferably begins at some predetermined brake actuating pressure, which may in turn be determined in accordance with some operating condition or conditions of the vehicle. Typically, proportioning should begin at a higher brake actuating pressure when the rear wheels of the vehicle are more heavily loaded as compared to the brake actuating pressure at which proportioning should begin when the vehicle is unloaded or only lightly loaded. The proportioner embodying the invention senses deceleration of the vehicle to actuate the proportioning system and is particularly adept at tripping the proportioner at a particular predetermined vehicle deceleration. Since a heavier loaded vehicle will require higher brake actuating pressure to attain that deceleration than would a lightly loaded vehicle, the proportioner will effectively operate in a load sensing manner even though it does not directly sense load.

When the brake circuit in which the proportioner 10 is installed is in the brake released position and there is no brake actuating pressure therein, the various elements of the system are in the position shown in FIG. 1. In particular, the proportioning pistons 44 and 104 are in the rightward positions shown, abutting the retainer 94. The hold-off pin 128 extends through opening 100. The control valve 180 is contained within the nozzle 172 and is shielded by the flow divider 146 from any fluid flow passing between the flow divider and the retainer 94.

Upon brake actuation, the master cylinder of the system generates brake actuating pressure which is delivered to inlet 30. The brake fluid flows through inlet 30 into the radially outer portion of chamber end 156. Some of the fluid under pressure flows through passages 38 and 36 into chamber 60, and acts on the left ends of the proportioning pistons 44 and 104. The flow is divided by the flow divider 146, with most of the fluid flowing along the outside of the divider, through flow openings 102 and then between the retainer 94 and the divider 146, along the left end of the nozzle 172 and through the opening 100. The holdoff pin 128 allows fluid flow through its bore 134 and slots 136 into the cross passage 124. This flow then continues through the castellated end 92 of the proportioning piston 44 into the annular outlet chamber 90, from which it passes through outlet 32 to the wheel brake or brakes connected thereto. The brake actuating pressure being delivered to the wheel brakes also acts on the effective area of flange 110 of the first stage proportioning piston 104 and the effective area of flange 72 of the second stage proportioning piston 44. These effective areas are larger than the effective areas of the respective flanges 108 and 54 of the pistons 104 and 44 exposed to brake actuating pressure in chamber 60, and the forces generated by pressure sequentially overcome the proportioning springs 66 and 118. Flange 110 of the first stage proportioning piston 104 engages spacer 116 as that piston is moved leftwardly as seen in FIG. 1. This movement of the first stage proportioning piston 104 relative to the retainer 94 is sufficient to move the holdoff pin 128 leftward out of opening 100 so that the pin no longer blocks potential closure of opening 100 by the control valve 180. The first stage proportioning piston 104 is preset by brake actuating pressure under all vehicle load conditions. The second stage proportioning piston 44 is moved leftwardly as seen in FIG. 1 until the piston end 64 engages the spacer end 70 under only heavier vehicle load conditions requiring higher brake actuating pressure than no-load or light-load conditions. If a relatively light brake actuating pressure is required, the first stage proportioning piston may be present but not the second stage proportioning piston. In all instances either or both of the first and second stage proportioning pistons are armed for the travel necessary for output displacement at a level below that at which proportioning action is to begin.

A part of the fluid flow entering inlet 30 passes through the accelerating orifice 164 in a generally radially inward direction. The flow deflector 148 deflects this flow so that some of it passes through the space 166 between the divider 146 and the deflector 148, and then proceeds radially inward to pass along valve 180 and through the annular orifice 192. This flow joins with the larger flow passing between retainer 94 and the flow divider 146 earlier described. Fluid flow and increased pressure also tends to pass through openings 152 rearwardly, which is rightwardly as seen in FIG. 1, in the inertia chamber 142. This puts some fluid pressure on the back end of the control valve which will also urge the valve toward the closed position as the valve head approaches opening 100 upon inertia actuation.

As the brake actuating pressure builds up in the vehicle wheel brakes, the vehicle is decelerated. When the desired deceleration is obtained at which the proportioner 10 is to become operative, the ball 176, actuated by inertia, moves forward and upward, leftwardly as seen in FIG. 1, by rolling along the lower wall surface 204. The ball carries the saddle frame 178 with it, moving the control valve 180 axially in the same direction. The provision of a relatively unrestricted flow path around the ball and saddle frame, and the flow through openings 152, makes ball movement in the inertia chamber 142 substantially insensitive to fluid viscosity. The valve head 190 moves out of the protective shield formed by nozzle 172 and into the fluid flow path which is defined by the retainer 94 and the flow divider 146 as the path leads through opening 100. The flow energy of this fluid flow hastens the movement of the control valve 180 and therefore hastens the contact of the valve head 190 with the portion of the retainer 94 surrounding opening 100 and operating as a control valve seat. The flow energy action on the valve counteracts viscosity differences occurring with large fluid temperature changes. The proportioner is tripped by inertia at the same deceleration every time, typically within 0.5 ft/sec/sec. Once opening 100 is closed, no additional brake fluid can flow from inlet 30 through opening 100 to outlet 32. Outlet fluid connected to the vehicle wheel brakes is trapped within annular chamber 90 and cross passage 124. With the vehicle operator demanding additional brake actuation, the brake inlet pressure is further increased and this pressure is transmitted through passages 38 and 36 to chamber 60, where it acts on the smaller effective left ends of pistons 44 and 104. By proper differential area selections of the pistons and their respective ends, the proportioning piston 104 is caused to be moved rightwardly to begin the increase of the outlet pressure at a proportioned rate relative to the increase in brake inlet pressure at inlet 30. As the demand for braking action further increases, and if the second stage proportioning piston has been preset, the additional brake actuating pressure exerted in chamber 60 also moves the second stage proportioning piston 44 rightwardly, increasing pressure in chamber 90 and outlet 32 at a proportioned rate relative to the brake actuating pressure at inlet 30. The desired proportioning action is therefore obtained. Even though rightward movement of the first stage proportioning piston 104 carries with it the hold-off pin 128, that pin upon engagement with valve head 190 will not move to dislodge the valve head from its seat, and valve head 190 continues to maintain opening 100 closed. Spring 132 in the recess 126 is a very light spring and will easily yield, permitting the first stage proportioning piston 104 to continue to move rightwardly while stopping such further movement of the hold-off pin 128.

Upon brake release, the pressure at inlet 30 decreases, causing a corresponding decrease of pressure in chamber 60, which in turn permits the second stage proportioning piston to move leftwardly, with further decrease in brake pressure at inlet 30 similarly permitting the first stage proportioning piston 104 to move leftwardly. Both of these actions decrease the pressure at outlet 32. As the vehicle ceases to decelerate, the inertia force acting on ball 176 decreases until the outlet pressure is able to act on the valve head 190 through opening 100, moving the control valve 180 rearwardly. At the same time ball 176 tends to roll down the lower wall surface 204 so that the ball, the saddle frame 178, and the control valve move back to the position shown in FIG. 1. When the valve head 190 is removed from opening 100, the pressures in inlet 30 and outlet 32 are quickly equalized and the proportioning piston springs 66 and 118 respectively return the proportioning pistons 44 and 104 rightwardly to the positions shown in FIG. 1. The outlet fluid under pressure from the rear wheel brakes then flows through opening 100 to inlet 30 and the displacement fluid is returned to the master cylinder.

The hold-off pin 128 is of particular importance when the vehicle in which the proportioner is installed is accelerated in the reverse direction. It is possible for such reverse acceleration, which would be rightwardly as seen in FIG. 1, to cause the inertia ball 176 to tend to move leftwardly relative to the housing 12, tending to close the control valve head 190 against the seat surrounding opening 100 in much the same manner as occurs during forward deceleration. However, the hold-off pin 128 extends through the opening 100 sufficiently to be engaged by the valve head 190 and to prevent the control valve from closing opening 100. The spring 132 acting on pin 128 is sufficiently strong to prevent the valve from closing under this circumstance. Therefore full braking pressure is available to the wheel brakes connected to outlet 32 when the brakes are applied to stop the reverse movement. Similarly, if the vehicle goes down a sufficiently steep incline in the forward direction to allow the inertia ball to roll forwardly on wall surface 204, it will tend to move the control valve 180 to close orifice 100. Again, the hold-off pin 128 prevents the opening 100 from being closed under this condition. In either instance an open pathway is maintained for brake actuating pressure entering inlet 30 to be delivered through opening 100 and outlet 32 to the wheel brakes connected with that outlet when the brakes are applied.

The proportioner has the proportioning ratio of each piston controlled by the ratio of the effective piston input area on the piston left side, as seen in FIG. 1, to the larger effective output area on the piston right side. The range of brake actuating pressure through which proportioning is attained is controlled by piston travel, the maximum travel being determined by the spacers 68 and 116. The first stage proportioning 104 is contained within the second stage proportioning piston 44 to eliminate housing concentricity problems and side load friction losses which may occur if the pistons were arranged in series. The proportioning pistons have a common atmospheric vent chamber 80 connected to a single vent passage 82, eliminating the need for more than one vent passage and vent seal.

When the vehicle in which the proportioner is installed is pulling a trailer, the proportioner responds to trailer weight as a function of the required brake actuating pressure to achieve a specific deceleration without depending on tongue weight to load the vehicle. The proportioner senses the occurrence of front brake fade as the equivalent of added vehicle weight since both require additional brake actuating pressure to achieve a desired deceleration. This permits higher output brake actuating pressure to be furnished through the proportioner to the rear brakes under this condition before any proportioning action begins.

By using a saddle frame supported control valve instead of using the inertia ball directly to close an orifice, road bounce and sharp turns have substantially no effect on the operation of the system. Since the inertia system senses deceleration caused by brake actuating pressure required as a function of vehicle load, the system will function effectively even though some vehicle structural elements may cause a mechanically connected load sensing mechanism to incorrectly respond to vehicle load.

In the proportioner to which the invention is directed, the inertia ball begins its movement under each type of brake application from light brake apply to panic braking, and flow energy pulls the valve to a closed position, resulting in tripping the proportioner at the same deceleration rate under all such braking conditions. It has been found that the proportioning mode will become operative under such various braking conditions at the same rate within 0.5 ft/sec/sec. The proportioner will operate and be actuated by inertia alone when there is a very slow brake apply resulting in virtually no flow energy being available to move the valve into the closed position.

Bleeding air from the brake circuit including the proportioner is assured by the provision of the deflector opening 152 and the location of the accelerating orifice 164. Although the orifice 164 may be modified in its construction as a part of flange 158, somewhat like one of the openings 152, it would still assist in such bleeding. Any air bubbles will readily pass through these openings and the orifice, and through passage 38 to the bleeder valve 34. Any air contained in the right end of the proportioning section which cannot be bled through bleeder valve 34 will readily pass through outlet 32 and can be bled at a wheel brake.

The embodiments of the invention in which an exclusive property or privilege is claimed are defined as follows:

1. A brake fluid pressure proportioner having a housing with a brake actuating pressure inlet and a brake actuating pressure outlet, said proportioner comprising:

a pressure proportioning section having at least one pressure proportioning device normally positioned in a non-proportioning mode, and means responsive to brake actuating pressure to move said at least one proportioning device into its proportioning mode;

normally open valve means including a valve and a valve seat, brake actuating fluid under pressure flowing from said inlet to said outlet through said valve means when brake actuating pressure is supplied at said inlet while no proportioning action of said proportioning device is required, so as to bypass the proportioning mode of said at least one proportioning device and deliver the inlet brake actuating pressure to said outlet;

means moving said valve into engagement with said valve seat to close said valve means when proportioning action of said at least one proportioning device is to be initiated, said means including an inertia sensitive device causing initial movement of said valve toward said valve seat, and means directing fluid flow energy in brake fluid under brake actuating pressure flowing toward said valve seat to accelerate movement of said valve to close said valve means by engaging said valve seat, said valve being moved by the flow energy only after said valve has been moved toward said valve seat in response to inertia;

and means directing brake actuating pressure from said inlet to said at least one proportioning device when said valve means is closed, said at least one proportioning device then proportioning brake actuating pressure to said outlet at at least one predetermined proportioning ratio.

2. A brake fluid pressure proportioner having a housing with a brake actuating pressure inlet and a brake actuating pressure outlet, said proportioner comprising:

a pressure proportioning section having at least one pressure proportioning device normally positioned in a non-proportioning mode, and means responsive to brake actuating pressure below the least pressure level at which proportioning is to begin under any operative condition to move said at least one proportioning device into its proportioning mode;

normally open valve means including a valve and a valve seat, brake actuating fluid under pressure flowing from said inlet to said outlet through said valve means when brake actuating pressure is supplied at said inlet while no proportioning action of said proportioning device is required, so as to bypass the proportioning mode of said at least one proportioning device and deliver the inlet brake actuating pressure to said outlet;

means moving said valve into engagement with said valve seat to close said valve means when proportioning action of said at least one porportioning device is to be initiated, said means including an inertia sensitive device causing initial movement of said valve toward said valve seat, and means directing fluid flow energy in brake fluid under brake actuating pressure flowing toward said valve seat to accelerate movement of said valve to close said valve by engaging said valve seat, said valve being moved by the flow energy only after said valve has been moved toward said valve seat in response to inertia;

and means directing brake actuating pressure from said inlet to said at least one proportioning device when said valve means is closed, said at least one proportioning device then proportioning brake actuating pressure to said outlet at at least one predetermined proportioning ratio.

3. A brake fluid pressure proportioner having a housing with a brake actuating pressure inlet and a brake actuating pressure outlet, said proportioner comprising:

a pressure proportioning section having first and second stage pressure proportioning devices normally positioned in a non-proportioning mode, and means responsive to brake actuating pressure to move said proportioning devices into the proportioning mode;

normally open valve means including a valve and a valve seat, brake actuating fluid under pressure flowing from said inlet to said outlet through said valve means when brake actuating pressure is supplied at said inlet while no proportioning action of said proportioning devices are required, so as to bypass the proportioning mode of said proportioning devices and deliver full inlet brake actuating pressure to said outlet;

means moving said valve into engagement with said valve seat to close said valve means when proportioning action of said pressure proportioning section is to be initiated, said means including an inertia responsive ball, a saddle frame having said valve secured thereto, said saddle frame being pivotally supported on said ball at pivot points above the center of said ball and having its weight distributed to maintain said saddle frame balanced on said ball and said valve aligned with said valve seat, said ball moving within and relative to said housing at a predetermined deceleration and acting through said saddle frame to cause initial movement of said valve toward said valve seat, and means directing fluid flow energy in brake fluid under brake actuating pressure flowing from said inlet toward said valve seat to accelerate movement of said valve to close said valve means by engaging said valve seat, said valve being moved by the flow energy only after said valve has been moved toward said valve seat in response to inertia;

and means directing brake actuating pressure from said inlet to said first and second stage pressure proportioning devices when said valve means is closed, said proportioning devices then proportioning brake actuating pressure to said outlet at at least one predetermined pressure proportioning ratio.

4. A brake fluid pressure proportioner having a housing with a brake actuating pressure inlet and a brake actuating pressure outlet, said proportioner comprising:

a pressure proportioning section having at least one pressure proportioning device normally positioned in a non-proportioning mode, and means responsive to brake actuating pressure to move said at least one proportioning device into the proportioning mode;

normally open valve means including a valve and a valve seat, brake actuating fluid under pressure flowing from said inlet to said outlet through said valve means when brake actuating pressure is supplied at said inlet while no proportioning action of said proportioning device is required, so as to bypass the proportioning mode of said at least one proportioning device and deliver the inlet brake actuating pressure to said outlet;

means moving said valve into engagement with said valve seat to close said valve means when proportioning action of said pressure proportioning section is to be initiated, said means including an inertia sensitive device causing initial movement of said valve toward said valve seat, and means directing fluid flow energy in brake fluid under brake actuating pressure flowing toward said valve seat to accelerate movement of said valve being moved by the flow energy only after said valve has been moved toward said valve seat in response to inertia;

means directing brake actuating pressure from said inlet to said at least one proportioning device when said valve means is closed, said at least one proportioning device then proportioning brake actuating pressure to said outlet at at least one predetermined proportioning ratio;

and a hold-off member mounted on said at least one pressure proportioning device and extending through said normally open valve means when said at least one proportioning device is positioned in the non-proportioning mode, said hold-off member acting on said valve to prevent closure of said valve means until said at least one proportioning device is moved into its proportioning mode so that the fluid connection between said inlet and said outlet through said valve means cannot be closed before a predetermined minimum brake actuating pressure sufficient to move said at least one proportioning device into its proportioning mode is delivered through said proportioner.

5. A deceleration sensitive brake fluid pressure proportioner comprising:

a housing having a fluid inlet, a fluid outlet, an inertia chamber, and proportioning chambers formed by a bore in said housing;

a saddle frame axially movable in said inertia chamber and having an inertia ball rotatably mounted therein, said saddle frame and said ball being received in said inertia chamber for substantially free linear movement therein along the chamber axis;

a proportioner control valve secured to said saddle frame, said housing having mounted therein between said chambers a retainer having an orifice therein axially aligned and cooperating with said valve so as to be closed by said valve by movement of said inertia ball and said saddle frame which is at least initiated at a predetermined deceleration;

brake fluid pressure proportioning means in said proportioning chamber bore effective upon closure of said orifice by said valve to proportion brake fluid outlet pressure at said fluid outlet relative to brake fluid pressure at said fluid inlet;

and flow directing means in said inertia chamber receiving brake fluid flow from said fluid inlet and directing the flow of said brake fluid around said valve to accelerate movement of said valve toward said orifice when such movement is initiated by deceleration sensing movement of said inertia ball and said saddle frame, said flow directing means also directing brake fluid flow within said inertia chamber around said ball and said saddle frame to assist said ball and said valve and said saddle frame in movement toward said orifice;

said fluid inlet being so connected to said inertia chamber that fluid flow therethrough to said flow directing means is substantially at a right angle to the axis of linear movement of said ball and said saddle frame.

6. In a deceleration sensitive brake pressure proportioner having a first housing section containing proportioning means selectively operable in a non-proportioning mode and a proportioning mode, normally open valve means mounted in said first housing section and through which brake actuating pressure may flow when the proportioning means is in the non-proportioning mode, said valve means being closed to prevent brake actuating pressure from flowing therethrough when the proportioning means is in the proportioning mode, the improvement comprising:

an inertia sensing assembly for closing said valve means at a predetermined deceleration, said assembly comprising a second housing section having an axially extending recess open at one end and closed at the other end and defining an inertia chamber, and a brake actuating pressure inlet opening transversely into said recess adjacent said recess one open end, said first housing section being secured to said second housing section and closing said chamber open end with said normally open valve means communicating with said chamber;

an inertia ball in said inertia chamber engaging and supported by a ramp formed by a lower wall surface of said chamber, said second housing section being oriented to normally cause said ramp to define an incline extending upwardly with the recess one open end being higher than the other end, said ball having its center below the chamber axis and having substantial clearance between the ball and the upper wall surface of said chamber;

a saddle frame fitting over said ball, said saddle frame having a socket in which said ball is received, said socket having side pivot supports engaging said ball only at pivot points on a transverse line perpendicularly skew to and above the chamber axis and the ball center, a first end and a second end extending from said socket, said ends having their masses concentrated below said ball center toward said chamber lower wall surface, said first end having a valve mounted thereon extending coaxially with said valve means and said chamber, the mass of said second end counterbalancing said first end and said valve about said pivot points;

said ball moving up the incline defined by said chamber lower wall surface to move said saddle frame and said valve to close said valve means at a predetermined deceleration.

7. A valve control mechanism responsive to deceleration, said mechanism comprising:

a ramp, an inertia responsive ball on said ramp and movable up said ramp at a predetermined deceleration of said ramp, a saddle frame fitting over said ball and having a socket defined by side pivot supports and frame ends so that only said side pivot supports engage said ball, such engagement being at a pair of pivot points on said ball located on a line extending above the ball center and transversely of said ramp, said frame ends having their masses concentrated below the ball center near said ramp, a valve member mounted on one of said frame ends and extending axially parallel to said ramp and adapted to close an opening through a valve seat upon sufficient movement of said ball up said ramp, said saddle frame and said valve member being carried by said ball and balancing on said ball at said pair of pivot points.

8. A valve control mechanism responsive to deceleration and fluid flow, said mechanism comprising:

a housing having a fluid inlet, a fluid outlet having a valve seat formed thereabout, and a chamber fluid connected with said inlet and said outlet and having a chamber wall section defining a ramp;

an inertia responsive weight on said ramp and movable up said ramp toward said outlet at a predetermined deceleration of said housing, a saddle frame fitting over said weight and having a socket defined by side pivot supports and frame ends so that only said side pivot supports engage said weight, such engagement being at a pair of transversely disposed pivot points on said weight located on a line extending transversely of said ramp and above the weight center, said frame ends having their masses concentrated below the weight center near said ramp;

a valve member mounted on one of said frame ends and extending axially parallel to said ramp and coaxially with said outlet, said valve member acting to engage said valve seat and close said outlet upon sufficient movement of said weight up said ramp, said saddle frame and said valve member being carried by said weight and balancing on said weight at said pair of pivot points;

and means dividing and deflecting fluid flow through said inlet into said chamber so that a part of that fluid flow will readily flow within said chamber behind said weight as said weight moves up said ramp and another part of that fluid flow flows through said outlet so long as said outlet is open and fluid flow is entering said inlet, said dividing and deflecting means being so constructed and arranged as to prevent the fluid flow through said outlet from affecting said valve member until said valve member has been moved toward said valve seat under influence of said weight as said weight moves up said ramp and thereafter to direct that fluid flow along said valve member in the direction of valve member movement toward said valve seat to accelerate said valve member movement into engagement with said valve seat.

9. A deceleration sensitive brake pressure proportioner comprising:
- a first housing section having a brake operating pressure outlet and containing proportioning means selectively operable in a non-proportioning mode and a proportioning mode;
- normally open valve means mounted in said first housing section and through which brake actuating pressure may flow to said outlet when the proportioning means is in the non-proportioning mode, said valve means being closed to prevent brake actuating pressure from flowing therethrough to said outlet when the proportioning means is in the proportioning mode;
- a second housing section secured to said first housing section and having a brake actuating pressure inlet, said second housing section containing inertia responsive valve closing means and brake actuating pressure fluid flow means accelerating closure of said valve closing means only after said valve closing means is actuated to begin valve means closing action;
- said first housing section having a bore therein, first and second proportioning pistons reciprocably received in said bore, said first proportioning piston being coaxially and reciprocally received in said second proportioning piston, each of said proportioning pistons having a first effective end area continuously exposed to any brake actuating pressure entering said inlet and a second effective end area larger than and opposing said first effective area and exposed to any pressure at said outlet, and first and second springs respectively continuously urging said first and second proportioning pistons toward non-proportioning positions;
- brake actuating pressure entering said inlet and passing through said valve means acting on said piston second effective end areas at a first predetermined pressure to move said first stage proportioning piston to an armed-for-proportioning position and at a second predetermined higher pressure to move said second stage proportioning piston to an armed-for-proportioning position and flowing to said outlet as non-proportioned brake operating pressure, and acting upon closure of said valve means on said piston first effective end areas to cause proportioned pressurization of fluid exposed to said second effective end areas and generate proportioned brake operating pressure at said outlet first by proportioning action of said first stage proportioning piston and then by proportioning action of said second stage proportioning piston.

* * * * *